United States Patent
Shyamsunder et al.

(10) Patent No.: US 8,433,700 B2
(45) Date of Patent: Apr. 30, 2013

(54) METHOD AND SYSTEM FOR TRIGGERING WEB CRAWLING BASED ON REGISTRY DATA

(75) Inventors: Karthik Shyamsunder, Winchester, VA (US); Srinivas Sunkara, Ashburn, VA (US); Alexander Durych Holmes, Sterling, VA (US); Andrew Simpson, Sterling, VA (US); Phani Pattappu, Ashburn, VA (US)

(73) Assignee: Verisign, Inc., Dulles, VA (US)

( * ) Notice: Subject to any disclaimer, the term of this patent is extended or adjusted under 35 U.S.C. 154(b) by 146 days.

(21) Appl. No.: 12/884,795

(22) Filed: Sep. 17, 2010

(65) Prior Publication Data

US 2012/0072407 A1    Mar. 22, 2012

(51) Int. Cl.
G06F 7/00     (2006.01)
G06F 17/30    (2006.01)

(52) U.S. Cl.
USPC .................................. 707/709; 707/E17.108

(58) Field of Classification Search .................. 707/709, 707/710, E17.108
See application file for complete search history.

(56) References Cited

U.S. PATENT DOCUMENTS

| | | | |
|---|---|---|---|
| 7,076,541 B1 * | 7/2006 | Burstein et al. | 709/223 |
| 7,685,192 B1 * | 3/2010 | Scofield et al. | 707/709 |
| 2002/0010682 A1 * | 1/2002 | Johnson | 705/59 |
| 2004/0167982 A1 * | 8/2004 | Cohen et al. | 709/226 |
| 2005/0192936 A1 * | 9/2005 | Meek et al. | 707/3 |
| 2008/0005127 A1 * | 1/2008 | Schneider | 707/10 |
| 2009/0216760 A1 * | 8/2009 | Bennett | 707/5 |
| 2009/0287641 A1 * | 11/2009 | Rahm | 707/3 |
| 2009/0328224 A1 * | 12/2009 | Hernacki et al. | 726/25 |
| 2010/0114858 A1 | 5/2010 | Dmitriev | |
| 2010/0179953 A1 * | 7/2010 | Kan et al. | 707/741 |
| 2010/0325092 A1 * | 12/2010 | Johnson | 707/673 |
| 2011/0066624 A1 * | 3/2011 | Turakhia | 707/748 |

OTHER PUBLICATIONS

Golden, Kevin C., "Notice of New Service and Request for Preliminary Determination Letter," dated Mar. 22, 2007, Retrieved from the Internet on Feb. 16, 2012 at URL:http://www.icann.org/en/registries/rsep/verisign-notice-22mar07.pdf (7 pages).
Rajab et al., "Peeking Through the Cloud: DNS-Based Estimation and Its Applications," *Applied Cryptography and Network Security* (*Lecture Notes in Computer Science*), Berlin and Heidelberg, Germany, Jun. 5, 2007, pp. 21-38.
International Search Report and Written Opinion, dated Feb. 24, 2012, in International Application No. PCT/US2011/051911 (15 pages).

* cited by examiner

*Primary Examiner* — Phong Nguyen
(74) *Attorney, Agent, or Firm* — MH2 Technology Law Group, LLP

(57) ABSTRACT

A method of triggering crawling of a domain includes receiving information related to a domain from a registrar and processing the information related to the domain. The method also includes storing the processed information in a registry zone file and forming a list of registry data based on the processed information. The list of registry data comprises a subset of the registry zone file. The method further includes crawling one or more of the domains in the list of registry data.

14 Claims, 4 Drawing Sheets

METHOD AND SYSTEM FOR TRIGGERING WEB CRAWLING BASED ON REGISTRY DATA

BACKGROUND OF THE INVENTION

The VeriSign® Internet Profile Service (IPS) for Registrars is a service that provides valuable information related to millions of .com, .net, and .tv domain names. Among other uses, information provided by IPS helps registrars reach existing and prospective customers with timely and targeted offers.

The IPS for Registrars provides information based on Web site and domain name attributes, such as rich media content, business classification and domain name resolution status, to deliver relevant, actionable reports that help registrars identify specific domain names and audiences for marketing campaigns. By better segmenting and targeting customers and prospects, registrars can improve domain name registration and renewal rates, and identify new business opportunities.

The IPS provides several reports to registrars including the Pending Delete Domain Evaluation Beta Report, All Expiring Non-Resolving Domain Names Reports, Newly-Registered Non-Resolving Domain Names Reports, Rich Media Content Reports, and Internationalized Domain Name (IDN) Reports.

Despite the functionality provided by the IPS and existing web crawlers, there is a need in the art for improved methods and systems for providing domain information to registrars and other information consumers.

SUMMARY OF THE INVENTION

The present invention relates generally to computer networks. More specifically, the present invention relates to methods for triggering crawling or spidering of domains based on near real-time data provided by a registry. In a particular embodiment, data related to domains that are added, modified, or deleted during a short period of time are made available to a search engine in order to trigger crawling within several minutes after the domain related transaction event in the registry. The methods and techniques can be applied to a variety of computer networks and communications systems.

According to an embodiment of the present invention, a method of triggering crawling of a domain is provided. The method includes receiving information related to a domain from a registrar and processing the information related to the domain. The method also includes storing the processed information in a registry zone file and forming a list of registry data based on the processed information. The list of registry data comprises a subset of the registry zone file. The method further includes crawling one or more of the domains in the list of registry data.

According to another embodiment of the present invention, a method of performing a web site crawl is provided. The method includes receiving a zone file update report comprising a list of domains associated with changes in registration status during a predetermined time period. The method also includes crawling one or more web sites associated with the domains listed in the zone file update report.

According to yet another embodiment of the present invention, a method of providing domain information to a web crawler is provided. The method includes receiving information related to a domain from a registrar during a predetermined time period, processing the information related to the domain, and storing the processed information in a registry zone file. The method also includes forming a list of registry data based on the processed information, establishing a threshold value for domain resolution requests, and determining that a number of resolution requests for a second domain in the predetermined time period is greater than the threshold value. The method further includes adding information related to the second domain to the list of registry data and making the list of registry data accessible to a web crawler.

According to a specific embodiment of the present invention, a computer-readable storage medium comprising computer-readable instructions tangibly embodied on the computer-readable storage medium, which, when executed by a data processor, triggers crawling of a domain is provided. The plurality of instructions include instructions that cause the data processor to receive information related to a domain from a registrar and instructions that cause the data processor to process the information related to the domain. The plurality of instructions also include instructions that cause the data processor to store the processed information in a registry zone file and instructions that cause the data processor to form a list of registry data based on the processed information. The list of registry data comprises a subset of the registry zone file. The plurality of instructions further include instructions that cause the data processor to crawl one or more of the domains in the list of registry data.

According to another specific embodiment of the present invention, a computer-readable storage medium comprising computer-readable instructions tangibly embodied on the computer-readable storage medium, which, when executed by a data processor, performs a web site crawl is provided. The plurality of instructions include instructions that cause the data processor to receive a zone file update report comprising a list of domains associated with changes in registration status during a predetermined time period. The plurality of instructions also include instructions that cause the data processor to crawl one or more web sites associated with the domains listed in the zone file update report.

According to yet another specific embodiment of the present invention, a computer-readable storage medium comprising computer-readable instructions tangibly embodied on the computer-readable storage medium, which, when executed by a data processor, provide domain information to a web crawler is provided. The plurality of instructions include instructions that cause the data processor to receive information related to a domain from a registrar during a predetermined time period, instructions that cause the data processor to process the information related to the domain, and instructions that cause the data processor to store the processed information in a registry zone file. The plurality of instructions also include instructions that cause the data processor to form a list of registry data based on the processed information, instructions that cause the data processor to establish a threshold value for domain resolution requests, and instructions that cause the data processor to determine that a number of resolution requests for a second domain in the predetermined time period is greater than the threshold value. The plurality of instructions further include instructions that cause the data processor to add information related to the second domain to the list of registry data and make the list of registry data accessible to a web crawler.

Many benefits are achieved by way of the present invention over conventional techniques. For example, embodiments of the present invention enable domains to be placed in a crawl queue only minutes after a new domain has been added. Moreover, the comprehensiveness with which domains are crawled is increased by embodiments of the present invention since all domains in the zone that have undergone changes are crawled, rather than only domains that have been linked by other domains. By triggering crawls based on changes to the registry database, the timeliness and efficiency of crawling is improved over conventional techniques. These and other embodiments of the invention along with many of its advantages and features are described in more detail in conjunction with the text below and attached figures.

DETAILED DESCRIPTION OF SPECIFIC EMBODIMENTS

Figure 1:
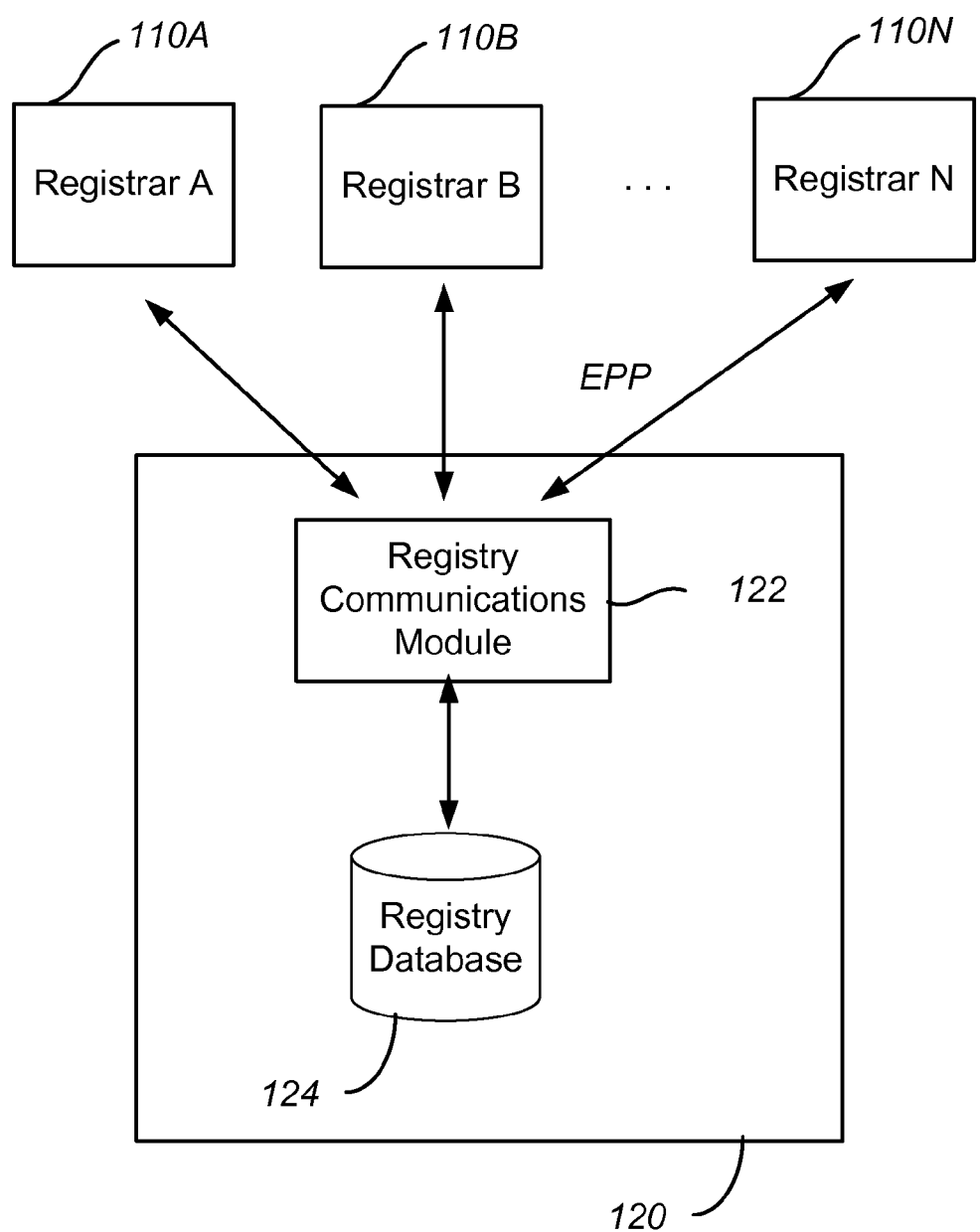
FIG. 1 is a simplified schematic diagram illustrating a shared registry system according to an embodiment of the present invention.

FIG. 1 is a simplified schematic diagram illustrating a shared registry system according to an embodiment of the present invention. The shared registry system includes a number of registrars 110A, 110B, through 110N. The registrars 110A-N transmit information related to domains to the registry 120. As illustrated in FIG. 1, registration information can be transmitted to the registry using EPP or other suitable protocols. As part of the shared registry system, registrars are provided with a channel to, for example, make changes to a current registration or to add a new registration. Using the registrar channel and EPP, registrars 110A-N submit commands to the registry 120 including create, update, transfer, renew, delete, or the like in order to perform desired operations. In some embodiments, approved registrars are the only entities able to submit commands through the registrar channel (illustrated as the connections to the registry communications module 122), which provides for secure communications between the registrars and the registry.

After receipt of the commands from the registrars, the registry 120 processes the commands and stores domain name information (e.g., domain name, nameserver, IP address, and the like) in the registry database 124. As will be evident to one of skill in the art, the registry database 124 is typically a distributed database operated by the registry 120. The registry database will include information used in creating a zone file as well as other information related to the operation of the registry.

As described more fully throughout the present specification, embodiments of the present invention access data stored in the registry database in order to provide a portion or all of the accessed data to third party consumers. Although some implementations read data from the registry database in order to create a data file that includes a subset of the data stored in the registry database, the present invention is not limited to this particular implementation. Audits of the registry database, tracking and use of a transaction log, or the like can be used to provide the data file. In some embodiments, changes in the registry database result in the generation of an event that is used by a third party or the registry to trigger a crawl of predetermined domains.

One format in which changes to the registry data can be provided is referred to as a rapid zone update (RZU) file. An RZU file includes information on changes to the registry that have occurred in a predetermined period prior to creation of the RZU file. This information will include a list of the domain names and information about the domains. As an example, an RZU file could include all changes to the registry data (i.e., changes to the zone file) in the last five minutes. For this example, an RZU file would be produced each five minutes, providing a user of the RZU files with insight into the changes that have taken place in the zone file over each five minute period. For instance, the RZU file could list 1700 new domains that were added, 1500 domains that were deleted, or the like. Although five minutes is used as an example above, embodiments of the present invention are not limited to this particular time period and other time periods could be utilized according to embodiments of the present invention. One of ordinary skill in the art would recognize many variations, modifications, and alternatives.

Thus, embodiments of the present invention provide RZU files as a mechanism for creating a "snapshot" showing the changes to the registry zone file over a predetermined period. RZU files supplement information available from a download of the zone file since the RZU files provide information, not on the entire zone file, but on changes to the zone file. By combining several sequential RZU files, changes in the zone file extending over larger time periods than that covered by a single RZU file can be observed.

Embodiments of the present invention are not limited to disseminating information in the form of RZU files. Although RZU files are one mechanism that provides access to changes in the registry database, the present invention is not limited to this mechanism. When a new domain is registered or other actions are taken with respect to a domain, information related to the domain and the changes to the registry database can be disseminated to users, such as a search engine, in near real time. Using such information, the search engine is able to crawl the indicated domain, not based on a request from the domain owner or other user, but based on the disseminated information related to addition or other change in the status of the domain. In this manner, embodiments of the present invention enable a third party to be notified of the occurrence of an event (e.g., addition of a domain name, deletion of a domain name, transfer of a domain name, nameserver changes for a domain name, or the like) and then take one or more actions (e.g., crawl the new domain) based on the occurrence of the event. As an example of non-RZU files useful in triggering a crawl, other internal databases maintained by the registry could be used to provide the data used to trigger the crawl. For example, the core SRS database associated with the .com and .net registries, the Name Store database associated with the .cc and .tv registries, or the like could be utilized.

According to embodiments of the present invention, RZU files or other zone file information is provided to search engines or other information consumer on a periodic or non-periodic basis. As an example, a search engine could obtain the RZU files at five minute intervals and use the RZU file to initiate crawling of domains listed in the RZU file. The frequent availability of the zone file information will enable the search engine to provide updated search information for those domains at a high frequency, increasing the quality of the search results obtained by users. A search engine could use the data file provided herein to supplement spidering performed by the search engine. As an example, if the RZU files are posted to a website, search engines could access the website at a periodic basis and use the RZU files to trigger a crawl of the domains listed in the RZU files. Rather than relying on spidering, the search engine will be able to access a list of domains to be crawled at a periodic basis, improving the search results produced by the search engine. Additionally, software programs used to characterize domains could also be provided with a list of domains to be analyzed, reducing the workload for such software since domains with no changes will not be repeatedly analyzed by the software, which may occur if the entire zone file is analyzed. For a crawling service that charges on a per-domain basis, triggering a crawl based on the updates to the registry database (or other data sources discussed herein) can reduce the cost of the crawling charges since only domains associated with changes are crawled instead of all domains in the zone file. Prioritization of domains to be crawled is provided by embodiments of the present invention, enabling a crawling service to reduce the number of sites crawled, but potentially charging a higher price for each domain crawled, increasing system efficiency. It should be noted that in some embodiments, rather than using a five minute increment, a format providing information on changes to the domains in real time or near real time could be utilized. In these embodiments, trigger crawling of the newly added or modified domains could be initiated in a time of seconds. Thus, in these embodiments, data related to domains that are added, modified, or deleted during a short period of time (e.g., on the scale of or less than a second) are made available to a search engine in order to initiate trigger crawling within several seconds or less after the occurrence of the domain related transaction event in the registry.

Embodiments of the present invention provide benefits because of the near real time nature of the domain information generated as described herein. For example, because the frequency with which data can be provided is on the time scale of several minutes, crawls can be triggered much more frequently than is typical for spidering applications. Moreover, changes to a domain that are not visible on a longer time period (e.g., changing a domain from a first state to a second state, and then restoring the domain to the first state prior to the spidering application crawling the site) are visible using embodiments of the present invention. In other words, for many search engines, a key goal is performing crawling at the proper time. Preferably, the crawl would happen shortly after the domain has been changed, for example, added. Utilizing embodiments of the present invention, search engines or other users are able to implement spidering and crawls in response to changes in the domain status, providing for timely crawling.

Figure 2:
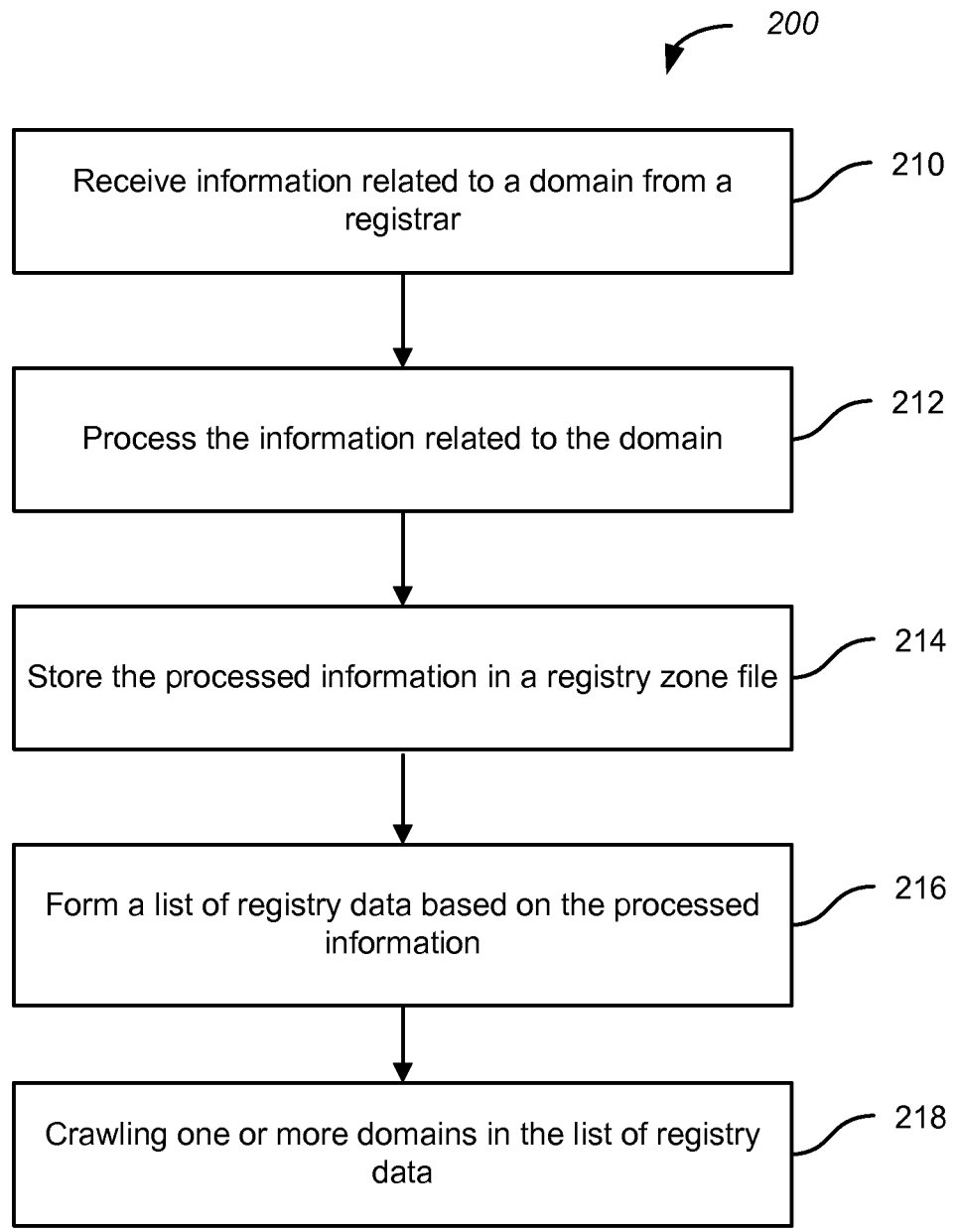
FIG. 2 is a simplified flowchart illustrating a method of triggering domain crawling according to an embodiment of the present invention.

FIG. 2 is a simplified flowchart illustrating a method of triggering domain crawling according to an embodiment of the present invention. The method 200 includes receiving information related to a domain from a registrar (210). The information will typically be received in accordance with EPP or other suitable protocol from a registrar that is one of a plurality of registrars associated with a shared registration system (SRS). The registry will then process the information related to the domain (212) and store the processed information in a registry zone file (214). The registry zone file can be stored in a registry database as discussed in relation to FIG. 1. The domain information can be related to a number of registry functions, including addition of a domain, deletion of a domain, transfer of a domain, or the like.

The method also includes forming a list of registry data based on the processed information (216). The list of registry data comprises a subset of the registry zone file, for example, an RZU file. In an alternative embodiment, the registry may post the list of registry data on an FTP server accessible to third parties (e.g., approved users of the data) in order to make the list of registry data an accessible resource. The method further includes crawling one or more of the domains in the list of registry data (218). By crawling the domains that have experienced changes, rapid updating of search results can be provided along with efficiency savings resulting from not crawling all domains listed in the zone file.

According to a specific embodiment of the present invention, the method 200 further includes establishing a threshold value for domain resolution requests, determining that a number of resolution requests for a domain in a predetermined time period is greater than the threshold value, and adding the domain to the list of registry data. This specific embodiment provides a list based, not only on changes to the registry database, but also on traffic analysis, which can provide additional insight into data present on a website associated with the domain. For example, as bloggers make comments on a website, the traffic could result in addition of the domain to the list of registry data. In another specific embodiment, the list of registry data is sorted based on the frequency of domain resolution requests.

It should be appreciated that the specific steps illustrated in FIG. 2 provide a particular method of triggering domain crawling according to an embodiment of the present invention. Other sequences of steps may also be performed according to alternative embodiments. For example, alternative embodiments of the present invention may perform the steps outlined above in a different order. Moreover, the individual steps illustrated in FIG. 2 may include multiple sub-steps that may be performed in various sequences as appropriate to the individual step. Furthermore, additional steps may be added or removed depending on the particular applications. One of ordinary skill in the art would recognize many variations, modifications, and alternatives.

In addition to interaction with registrars, the registry typically performs domain resolution functions for internet users. In some cases, domain resolution services are performed by intermediary services although the registry is ultimately involved due to the hierarchical caching system utilized by the domain name system. The frequency with which domains are requested can be utilized to form lists of domains in a manner similar to that discussed above or in combination with the domain changes discussed above. For example, during a given time period (e.g., five minutes), domains that are requested at a level greater than a threshold value can be compiled to form a list of most-requested domains. This list could be posted in a publicly accessible manner or distributed to customers and used to trigger crawling of these domains.

Utilizing information related to the frequency of domain resolution requests (i.e., DNS lookups), the list of registry data (e.g., the RZU file) can be updated to include the domains characterized by domain resolution requests greater than a threshold value. As an example, if, during a five minute period associated with an RZU file, a domain in the list experiences a number of domain resolution requests greater than the threshold, the domain can be highlighted as a domain of particular interest. Additionally, domains from previous RZU files could be added to a later RZU file based on the number of domain resolution requests exceeding a predetermined threshold. Such information could be useful to a search engine or other user, since for a viral marketing campaign, a new domain may be added. The addition of the domain name would trigger a search engine to crawl the new domain as discussed above. As the marketing campaign gains traction, the number of domain resolution requests would increase, triggering additional crawling based on the traffic level. Thus, use of the number of domain resolution requests for a domain could supplement the initial crawl with subsequent crawls. In this way, posts to a blog or comments posted on the site would trigger additional crawls to supplement the initial crawl based on addition of the web site. Domains included in a list of registry data can be sorted based on traffic level, added to a list of registry data, or the like.

Figure 3:
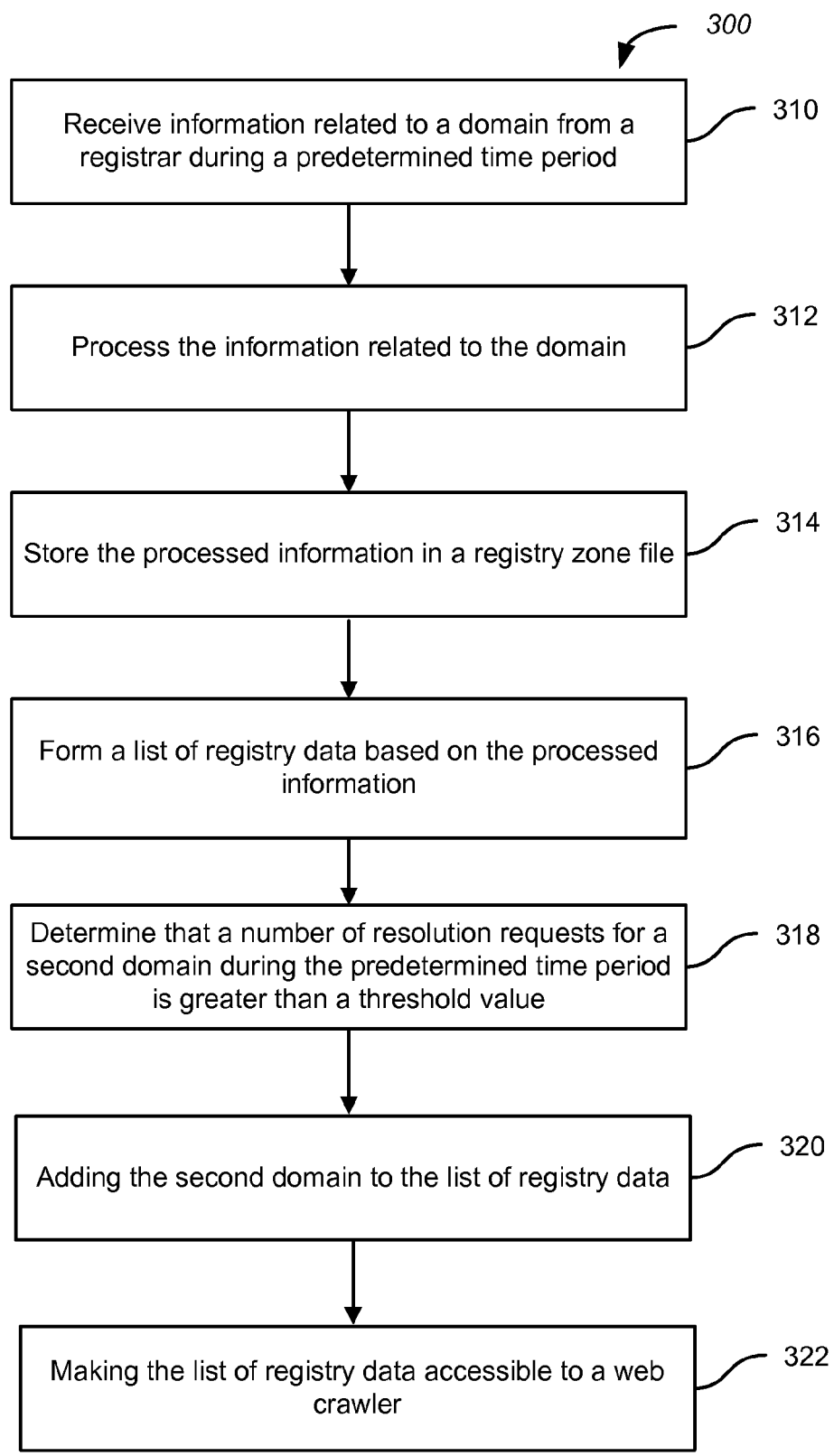
FIG. 3 is a simplified flowchart illustrating a method of providing domain information to a web crawler according to an embodiment of the present invention.

FIG. 3 is a simplified flowchart illustrating a method of providing domain information to a web crawler according to an embodiment of the present invention. The method 300 includes receiving information related to a domain from a registrar during a predetermined time period (310) and processing the information related to the domain (312). The registrar may be one of a plurality of registrars associated with an SRS and the domain information (e.g., related to addition, deletion, or transfer of a domain) can be received in accordance with EPP. The predetermined time period may be one of several suitable time periods, for example, less than a month, less than a week, less than a day; less than 12 hours, less than 6 hours, less than 1 hour, less than 30 minutes, less than 15 minutes, less than 10 minutes, less than 5 minutes, or the like.

The method also includes storing the processed information in a registry zone file (314) and forming a list of registry data based on the processed information (316). The list of registry data, which may be in the RZU file format discussed below, will include data on domains that have experienced changes during the predetermined time period. The change data (i.e., a subset of the registry zone file) can be used by search engines to crawl the domains based, in part, on the changes to the domains, which provides for more timely crawling than achieved by conventional methods.

The method further includes establishing a threshold value for domain resolution requests and determining that a number of resolution requests for a second domain in the predetermined time period is greater than the threshold value (318). Information related to the second domain is then added to the list of registry data (320) and list of registry data is made accessible to a web crawler (322). As an example, the list of registry data can be provided as an accessible resource by storing the list of registry data on an FTP server accessible to third parties.

It should be appreciated that the specific steps illustrated in FIG. 3 provide a particular method of providing domain information to a web crawler according to an embodiment of the present invention. Other sequences of steps may also be performed according to alternative embodiments. For example, alternative embodiments of the present invention may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize many variations, modifications, and alternatives.

Crawling of domains on multiple levels may be enabled by the embodiments of the present invention described herein. For example, a first status crawl could be triggered by the formation and/or publishing of the list of registry data. This first status crawl could determine characteristics of the domain that are generally independent of the information contained in the website, for example, if the domain resolves, it is a parked site, and the like. Based on the results of this first status crawl, a recommendation could be provided to a web crawler to initiate a second content crawl, for example, to provide information useful in providing search results. The first status crawl may be a limited crawl, which is then supplemented by the later, more complete crawl. Because a time lag sometimes exists between creation of a domain and addition of information of interest to a search engine on the web pages associated with the domain, a multi-step process could be used to trigger an initial crawl when the domain is added and then supplemental crawls are performed at predetermined times (e.g., periodic crawls on a weekly basis) for a predetermined time period (e.g., six months). In this manner, the crawling is repeated in a planned manner as data is added to the web pages of interest as a function of time.

In addition to crawls triggered based on changes to the registry database and DNS lookup traffic, some embodiments of the present invention utilize other data sources to supplement the data lists used to trigger crawls or provide independent triggering of the crawls. For example, security lists of domains that have been compromised (e.g., blacklists) can be used to trigger crawls or combined with other data discussed herein in order to trigger crawls. Other data sources include data received from registrars such as information that registrant has changed hands, that a registrant has changed hosting companies, data received from hosting companies related to changes to the hosted websites such as file uploading data. These data feeds may be free and publicly available or may be purchased and then integrated into the systems described herein. Therefore, the quality of the data used to trigger crawls may be improved by supplementing the data discussed herein, e.g., changes to the registry database, with additional data useful to the entity performing the crawling.

In addition to search engines consuming the data produced using embodiments of the present invention, other users can potentially benefit from the timely information discussed herein. For example, VeriSign operates the .name top-level domain (TLD) that is designed for individuals to create a presence and make online communications easy and accessible. Lists of domains added to the .name TLD could be provided to users, such as social networking sites in order to trigger crawls of the new domains, providing valuable information that can then be integrated into the social networking sites.

Changes in location of a domain may also be used alone, or in combination with other data sources described herein, to trigger crawling. In this implementation, the registry maintains information on the location of the domain (i.e., where the dominion is located) in the main server records. If a change is made to the main server records, this may imply that there is an underlying change happening for the particular domain. A crawl could therefore be initiated to determine additional information related to the domain. As discussed with domain resolution request frequencies, information on domain location changes could also be integrated into the list of registry data made available to web crawlers or could be provided as a separate data product.

The inventors have determined that as part of registry operations, it is possible for a domain to be deleted and then re-added. This process flow can indicate a change in ownership of the domain. Therefore, according to a particular embodiment of the present invention, the information related to the deletion and re-addition of the domain can be included in the list of registry data (e.g., an RZU file) and then used by a crawler in analyzing the domain ownership. In this example, depending on the distribution policies for the RZU file, the information included in the RZU file can include public information as well as information that is proprietary to the registry. An example of such proprietary information would be information related to a transfer of a domain, which is not included in some implementations of the zone file.

Figure 4:
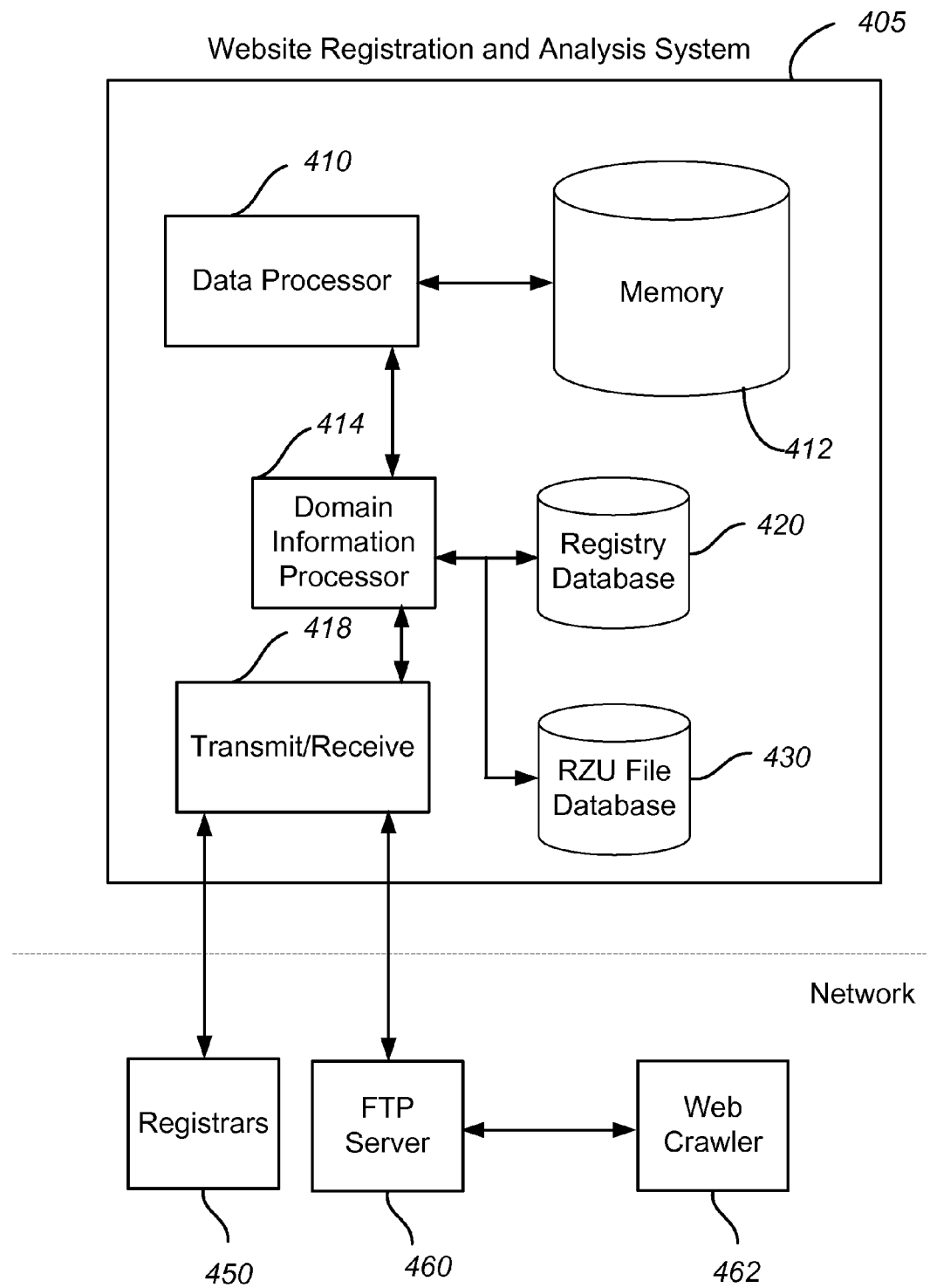
FIG. 4 is a simplified schematic diagram of a website registration and analysis system according to an embodiment of the present invention.

FIG. 4 is a simplified schematic diagram of a website registration and analysis system according to an embodiment of the present invention. The website registration and analysis system 450 includes a data processor 410 (also referred to as a processor), and a memory 412. The data processor 410 can be a general purpose microprocessor configured to execute instructions and data, such as a Pentium processor manufactured by the Intel Corporation of Santa Clara, Calif. It can also be an Application Specific Integrated Circuit (ASIC) that embodies at least part of the instructions for performing the method in accordance with the present invention in software, firmware and/or hardware. As an example, such processors include dedicated circuitry, ASICs, combinatorial logic, other programmable processors, combinations thereof, and the like. The memory (also referred to as a database or a computer readable medium) 412 can be local or distributed as appropriate to the particular application. The memory can store information related to the domains registered by the registry system, program code and instructions executed by the data processor 410, and other suitable data. In an exemplary embodiment, the memory 412 stores information used by the domain information processor 414, including time periods for creation of the zone file update files discussed herein, predetermined domain resolution request thresholds, and the like.

Memory 412 may include a number of memories including a main random access memory (RAM) for storage of instructions and data during program execution and a read only memory (ROM) in which fixed instructions are stored. Thus, memory 412 provides persistent (non-volatile) storage for program and data files, and may include a hard disk drive, flash memory, a floppy disk drive along with associated removable media, a Compact Disk Read Only Memory (CD-ROM) drive, an optical drive, removable media cartridges, and other like storage media.

The website registration and analysis system 405 also includes a domain information processor 414 coupled to the data processor 410, the registry database 420, and the RZU file database 430. Both the registry database 420 and the RZU file database 430 can be distributed databases as appropriate to the particular application. Although the RZU file database is illustrated in FIG. 4, embodiments of the present invention are not limited to the creation of RZU files and other suitable files including a subset of the information stored in the registry database, referred to as a list of registry data elsewhere in the present specification, can be used according to embodiments of the present invention. The domain information processor 414, which may be integrated into data processor 410, performs functions associated with registry operation including creation of the RZU file. These functions may include updating of the registry database or this function may be performed by data processor 410. As discussed above, the domain information processor is used to create the RZU files or other suitable files listing domains that have been added, deleted, or the like during a predetermined time period. In this manner, the domain information processor 414 is used to create a delta report of changes to the registry database 420.

In an embodiment of the present invention, the zone file update report includes a list of domains associated with changes in registration status during a predetermined time period. The zone file update report may be referred to as an RZU file. In the exemplary embodiment discussed below, the RZU file has a command format based on the nsupdate command line format although there are extensions and modifications that are also possible. The Rapid Zone update command consists of 4 verbs:

add name type data. Adds a new resource record with the specified type and data. Adding nameservers to existing domains and adding IP addresses to existing nameservers will generate this command.

add-new name type [data] (data is optional for RZU). Adds a new resource record with the specified type and data (optional). Only adding new domains and adding new nameservers will generate this command.

delete name [type [data]]. Deletes any resource records named name. If type and data is provided, only matching resource records will get removed.

rename oldNameserverName newNameserverName. Changes the nameserver name from oldNameserverName to newNameserverName.

name—domain name or nameserver name type—zone resource record type. RZU supports two types: NS and A data—resource data (nameserver name for NS record; ip for A record)

According to an embodiment of the present invention, the following illustrates the Sendfile command format. The general format for transactions in a DNS sendfile is:

TxID (add|mod|del|rup) table key [ . . . ]

or

TxID noop where:
1) TxID is the transactionid (primary key of TRANSACTION, TRANSACTIONATTRIBUTES, and all audit tables),
2) table is one of {"dn", "ns"},
3) key is a domain name or server name,
4) the "[ . . . ]" depends on the verb as follows (using regular expression syntax—parenthesis are present only for grouping):
  i. For add's: (attrname attrvalue)*
  ii. For mod's: (((add|del) attrname attrvalue)|(rename newkey))+
  iii. For del's: empty
  iv. For nip's: same as add
5) The valid attributes for domains are: ns (value is the server name), zi (value is 'y' or 'n')
6) The valid attributes for nameservers are: ip (value is dotted-quad)
7) "nip" stands for "replace-update" and is an alternate form of mod where the entire after-image state is present (mod's just contain the attributes that change).
8) The "noop" may be required by an implementation that needs to account for all transaction identifiers (used primarily to simplify the linkage between ISF's and SF's)

According to an embodiment of the present invention, the following rules for mapping from an SF Command to an RZU Command are utilized.

| SF Command | RZU Command |
|---|---|
| add dn name(key) [ns . . .] | add-new name NS [ . . .] |
| add ns name(key) [ip . . .] | add-new name A [ . . .] |
| del dn name(key) | delete name NS |
| del ns name(key) | delete name A |
| mod dn name(key) add ns . . . | add name NS . . . |
| mod dn name(key) del ns . . . | delete name NS . . . |
| mod ns name(key) add ip | add name A . . . |
| mod ns name(key) del ip | delete name A . . . |
| mod ns name(key) rename newname(newkey) | rename name newname |

According to an embodiment of the present invention, the following examples of mapping from an SF command to an RZU command are provided. In some cases, one SF command may bee mapped to multiple RZU commands:

Add a nameserver with no ip addresses:
SF: 123456780 add ns can020.ccsnet.net
RZU: add-new can020.ccsnet.net A Add a nameserver with one ip addresses:
SF: 123456781 add ns can020.ccsnet.net ip 204.124.166.98
RZU: add-new can020.ccsnet.net A 204.124.166.98
Add a nameserver with multiple ip addresses:
SF: 123456742 add ns can020.ccsnet.net ip 204.124.166.98 ip 204.124.1.1
RZU: add-new can020.ccsnet.net A 204.124.166.98
    add-new can020.ccsnet.net A 204.124.1.1
Add a domain with no nameservers
SF: 123456752 add dn superhorse.com zi y
RZU: add-new superhorse.com NS
Add a domain with one nameserver
SF: 123456782 add dn parker-company.com ns ns1.comstar.net zi y
RZU: add-new parker-company.com NS ns1.comstar.net
Add a domain with multiple nameservers
SF: 123456772 add dn southernil.com ns ns1.intertek.net ns ns2.intertek.net ns ns1.savvis.net zi y
RZU: add-new southernil.com NS ns1.intertek.net
    add-new southernil.com NS ns2.intertek.net
    add-new southernil.com NS ns1.savvis.net
Delete a nameserver
SF: 123456781 del ns can020.ccsnet.net
RZU: delete can020.ccsnet.net A
Delete a domain
SF: 123456712 del dn southernil.com
RZU: delete southernil.com (should we delete the nameserver/A record?)
Add an ip address to a nameserver:
SF: 263103078 mod ns ns1.hydra-999.com add ip 65.3.2.251
RZU: add ns1.hydra-999.com A 65.3.2.251
Add a nameserver to a domain
SF: 263103079 mod dn xyz.com add ns ns1.server.net
RZU: add xyz.com NS ns1.server.net
Remove an ip address from a nameserver:
SF: 263103080 mod ns ns1.hydra-999.com del ip 65.3.2.252
RZU: delete ns1.hydra-999.com A 65.3.2.252
Replace an ip address (add one and remove one):
SF: 263103079 mod ns ns1.hydra-999.com del ip 65.3.2.251 add ip 65.3.2.252
RZU: delete ns1.hydra-999.com A 65.3.2.251
    add ns1.hydra-999.com A 65.3.2.252
Rename a nameserver:
SF: 363103087 mod ns ns1.hydra-999.com rename newname.hydra-999.com
RZU: rename ns1.hydra-999.com newname.hydra-999.com In a particular embodiment of the present invention, zi (zone insertion) flags are handled as follows:
a) Any "add dn . . . zi n" SF command will be ignored. For example: add dn teliamobitel.net ns ns2.domaintech.se ns ns.domaintech.se zi n will be ignored. The data that comes with this command will be lost.
b) Any "mod dn . . . add zi y" SF command will be taken as "add dn" SF command. For example, mod dn teliamobitel.net del ns ns2.domaintech.se del ns ns.domaintech.se add zi y
c) Any "mod dn . . . add zi n" SF command will be taken as "del dn" but all other information that comes with the command will be lost.

In general, every time the RZU encounters and ignores the "ad dn . . . zi n" SF command there is a probability that the data sent with that command get lost; every time the RZU encounters and maps "mod dn . . . add zi y" SF command there is a probability that incomplete domain data get to the client side; every time the RZU encounters and maps "mod dn . . . add zi n" there is a probability that the data sent with that command get lost.

According to an embodiment of the present invention, the RZU file format can be as follows: A Rapid Zone Update (RZU) file has file extension of ".rzu". The first 2 lines are the header separated by the 3rd line (8 #s) from the real data body.
    line #1—"md5sum" followed by 4 spaces and the md5sum number (all the lines after the first line are included in the sum).
    line #2—"id" followed by 4 spaces and the file name (excluding the extension .rzu)
    line #3—"control#" followed by 4 spaces and two integers separated by a "-" (dash)
    line #4—######## (8#s)
    line #5 and beyond—contains one RZU command on each line.

Based on the RZU file format illustrated above, the following is a sample RZU file. The example RZU file is named 20100303-1.rzu:
    md5sum 12dfkjsdfklsdfwerawr13242dasdf
    id 20100303-1
    control#1234-5678
    ########
    add can020.ccsnet.net A
    add can020.ccsnet.net A 204.124.166.98
    add can020.ccsnet.net A 204.124.166.98
    add can020.ccsnet.net A 204.124.1.1
    add superhorse.com NS
    add parker-company.com NS ns1.comstar.net
    add southernil.com NS ns1.intertek.net
    add southernil.com NS ns2.intertek.net
    add southernil.com NS ns1.savvis.net
    delete can020.ccsnet.net A
    delete southernil.com
    add ns1.hydra-999.com A 65.3.2.251
    delete ns1.hydra-999.com A 65.3.2.252
    delete ns1.hydra-999.com A 65.3.2.251
    add ns1.hydra-999.com A 65.3.2.252
    rename ns1.hydra-999.com newname.hydra-999.com It is also understood that the examples and embodiments described herein are for illustrative purposes only and that various modifications or changes in light thereof will be suggested to persons skilled in the art and are to be included within the spirit and purview of this application and scope of the appended claims.

What is claimed is:
1. A computer-implemented method of triggering crawling of a domain, the method comprising:
    receiving information related to the domain from a registrar;
    processing the information related to the domain;
    storing the processed information in a registry zone file;
    forming a list of registry data based on the processed information, wherein the list of registry data comprises a subset of the registry zone file;
    crawling one or more domains in the list of registry data;
    establishing a threshold value for domain resolution requests;
    determining that a number of domain resolution requests for the domain in a predetermined time period is greater than the threshold value; and
    adding the domain to the list of registry data.
2. The method of claim 1 wherein the registrar is one of a plurality of registrars associated with a shared registration system.
3. The method of claim 1 wherein the information related to the domain is received in accordance with Extensible Provisioning Protocol (EPP).

4. The method of claim 1 wherein the information related to the domain is related to addition, deletion, or transfer of the domain.

5. The method of claim 1 wherein the registry zone file comprises a nameserver for the domain and an IP address for the nameserver.

6. The method of claim 1 further comprising providing the list of registry data as an accessible resource.

7. The method of claim 6 wherein providing the list of registry data as an accessible resource comprises storing the list of registry data on a file transfer protocol (FTP) server accessible to third parties.

8. The method of claim 1 further comprising sorting the list of registry data based on a frequency of the domain resolution requests.

9. A computer-implemented method of providing domain information to a web crawler, the method comprising:
   receiving information related to a first domain from a registrar during a predetermined time period;
   processing the information related to the domain;
   storing the information that is processed in a registry zone file;
   forming a list of registry data based on the information that is processed;
   establishing a threshold value for domain resolution requests;
   determining that a number of resolution requests for a second domain in the predetermined time period is greater than the threshold value;
   adding information related to the second domain to the list of registry data; and
   making the list of registry data accessible to the web crawler.

10. The method of claim 9 wherein the registrar is one of a plurality of registrars associated with a shared registration system.

11. The method of claim 9 wherein the information related to the domain is received in accordance with Extensible Provisioning Protocol (EPP).

12. The method of claim 9 wherein the domain information is related to addition, deletion, or transfer of at least one of the first domain or the second domain.

13. The method of claim 9 wherein the list of registry data is a subset of the registry zone file.

14. The method of claim 9 wherein making the list of registry data accessible to a web crawler comprises storing the list of registry data on an FTP a file transfer protocol (FTP) server accessible to third parties.

* * * * *